Feb. 10, 1931.                    S. FORMAN                    1,792,218
                           APPARATUS FOR MAKING COFFEE
                              Filed Feb. 12, 1930
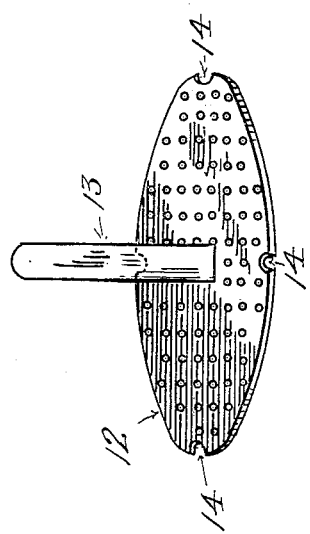
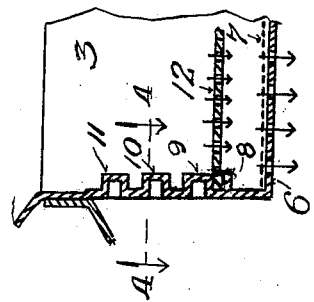
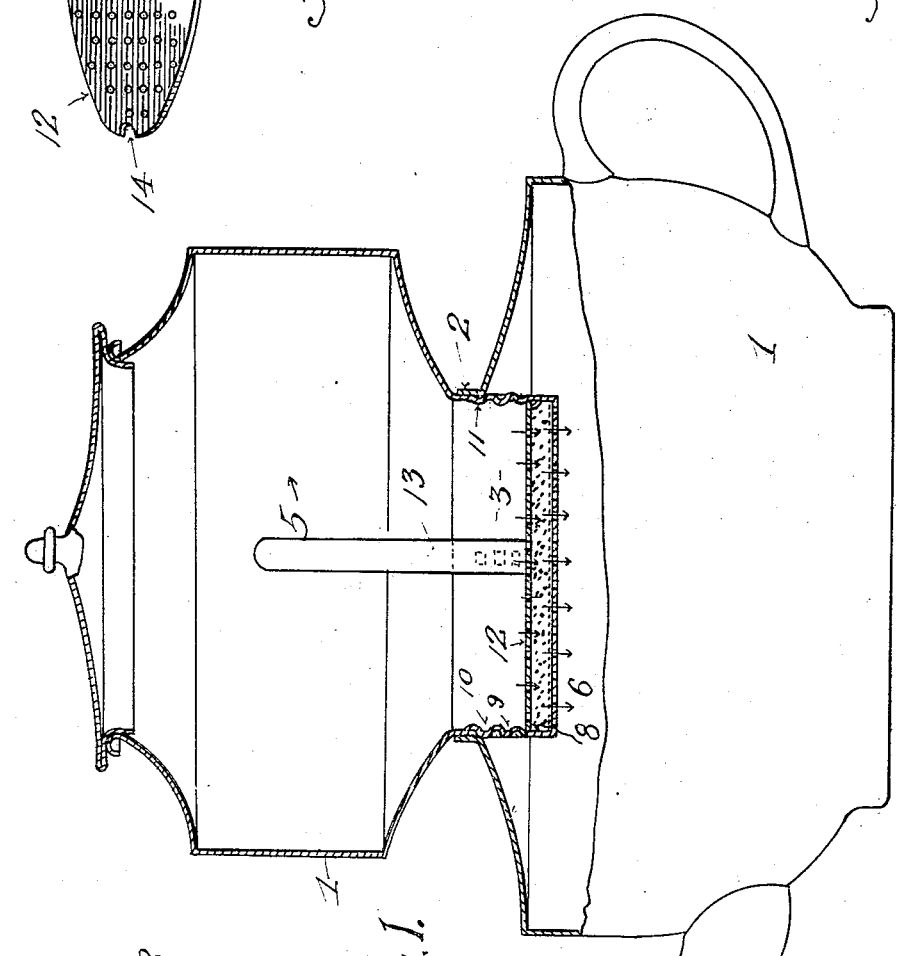
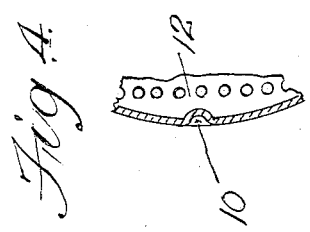
Inventor
Solomon Forman
By his Attorneys
Darby & Darby Patented Feb. 10, 1931

1,792,218

UNITED STATES PATENT OFFICE

SOLOMON FORMAN, OF NEW YORK, N. Y., ASSIGNOR OF ONE-HALF TO BENJAMIN FORMAN, OF BROOKLYN, NEW YORK

APPARATUS FOR MAKING COFFEE

Application filed February 12, 1930. Serial No. 427,693.

My invention relates generally to apparatus for making an infusion from granulated or pulverized material and a liquid, and more particularly to filter devices in which coffee is made by the drip method.

The primary object of my invention is the provision of means whereby the ground coffee is positively confined within a space of definite volume approximating the maximum space occupied by the ground coffee itself during filtration so that, with a given amount of ground coffee and water, filtration conditions can be substantially duplicated time after time to insure that uniformity of performance of the process requisite to results of high quality and dependability.

Further and related objects are the provision and means whereby the impact of the boiling water upon the ground coffee is avoided thus eliminating the danger of displacement thereof and consequent imperfect and too rapid filtration. By the same means I also prevent the trapping of air between the ground coffee and the surface which is often troublesome because of the disturbance of the layer of ground coffee by the escaping air bubbles.

One embodiment of my invention for achieving these and other desirable results is illustrated in the accompanying drawings in which—

Figure 1 is a side elevation partly in section of my improved coffee making apparatus;

Fig. 2 is a view in perspective of the perforated plate for retaining the ground coffee in the desired position and for other purposes;

Fig. 3 is a fragmentary sectional view of a part of the filter chamber; and

Fig. 4 is a sectional plan view of a fragment of Fig. 3 along the line 4—4.

Referring to the drawings, 1 is an open top coffee pot having the usual spout and handle. Into the open top 2 thereof projects the filter chamber 3 formed in the lower part of the hot water receptacle 5. Filter chamber 3 is cylindrical and of a size suitable to fit snugly but removably within the opening in the top of the coffee pot 1, as shown. It also has a perforated bottom 6 through which the extracted beverage may pass into the pot. The perforations 6 are preferably of substantial size, the ground coffee being prevented from passing therethrough by a filter 7 which may be made of any suitable material, rice paper for example, placed directly upon the perforated bottom.

In the sides of the filter chamber 3 are inwardly projecting lugs of any desired number. In Figs. 1 and 4 four such lugs are shown at 8, 9, 10 and 11. Preferably three or more sets of such lugs equally spaced around the sides are provided to form supports and retainers whereby a perforated cover and baffle may be positively positioned the desired distance above the bottom of the filter chamber for the amount of coffee being made. For example, when the disk 12 is in its lowest position, as shown in Figs. 1 and 3, the device is adjusted for making say two cups of coffee. If the disk is raised to the next higher position it would be then adjusted for a four cup capacity and so on up to the maximum capacity of the pot. This cover and baffle consists of a perforated disk 12 designed to fit loosely into filter chamber 3 provided with a handle 13 for convenience in handling. Around the periphery of said disk are notches 14 so positioned that one notch may be made to register with each set of lugs 8, 9, 10 and 11 and deep enough to permit the disk 12 to pass by the lugs when so registered.

In operation the receptacle 5 is placed in position on the top of pot 1, as shown in Fig. 1. The perforations 6 are covered by a filter paper 7. The desired quantity of ground coffee is then placed upon the filter paper within filter chamber 3 and the retaining disk 12 inserted and lowered until it is positioned the proper distance above the ground coffee. This is accomplished, as indicated above, by bringing the notches 14 into register with the lugs 8, 9, 10 and 11. It will be noted that all of the lugs 8 are an equal distance above the bottom of receptacle 5; that all of the lugs 9 are an equal but greater distance above the bottom; and that the lugs 10 and 11 are also at equal but still greater distances above the bottom. After the disk 12 has been brought to rest between the proper lugs it is rotated slightly to bring the notches 14 out of register with the lugs. Then the unbroken part of the periphery of the disk 12 will pass between two adjacent lugs of each series and the disk will be positively positioned and prevented from moving either upward or downward. The air space thus formed will be relatively small and will be quickly filled by the swelling of the coffee. In this way a measured amount of coffee may be confined within a space of definite volume with the result that the same conditions for filtration may be readily reproduced.

Through the use of this positively positioned perforated disk forming the top of the filter chamber proper hot water may be poured into the receptacle 5 without fear of disturbing the ground coffee and will be uniformly spread over the entire surface and allowed to filter gradually and uniformly into the coffee pot, the important matters of time and conditions of filtration being thus attended to almost automatically. I am aware that heretofore it has been the practice in drip coffee pots to place above the coffee a perforated disk or other means whereby direct impact of the water upon the coffee has been avoided, but such means have been positioned either a considerable distance above the coffee or directly upon it and has been retained in position only by its own weight. In the first instance, the coffee which is very finely ground and very dry is certain to mix with the water with the result that filtration is completed before a sufficient extraction has been effected and, in the latter instance, a very considerable variation in filtration conditions has been found to result from the humanly unavoidable variations in the manner in which the manual placing of the disk directly upon the coffee is done. Furthermore when the perforated disk is permitted to rest directly upon the exceedingly dry and finely pulverized coffee a large portion of the surface of the coffee is shielded from contact with the water by the unperforated portions of the disk. The result is that the water which passes through the perforations fails to moisten the ground coffee uniformly, with the result that the extraction is not uniform. If, as in my invention, the perforated disk is at the beginning of the process positioned slightly above the ground coffee so that a small air space between the top of the coffee and the bottom of the disk is provided the water which percolates through the perforations will immediately spread over the entire surface of the coffee to moisten it uniformly and yet no substantial displacement of the ground coffee will result since the coffee swells rapidly and soon fills the entire space beneath the disk. The positive retention of the ground coffee in its original position and within a definite volume by positive means which can move neither up nor down but which, at the same time, may be readily inserted and removed is, I believe, entirely novel and constitutes a decidedly valuable and useful improvement in such devices in that it permits of the reproduction of the same and the most desirable conditions for proper and economical filtration time after time for any amount of coffee within the capacity of the device.

What I claim is:

A coffee making machine comprising a coffee pot, a container supported by said pot and provided with a downwardly projecting portion having a perforated bottom and a plurality of horizontally extending lugs arranged in vertical rows on the inside wall thereof, a perforated disk of substantially the same diameter as the inside diameter of the downwardly projecting portion of said container provided with a plurality of notches therein of the horizontal width of said lugs, said notches being peripherally spaced on the disk to conform with the position of the vertical rows of lugs to permit the disk to be inserted in the downwardly projecting portion of said container to form a filter chamber adjustable in size between said disk and the perforated bottom of said container, the space between said vertical lugs being substantially equal to the thickness of said disk whereby said disk when inserted and positioned between lugs is held by said lugs against vertical movement.

In testimony whereof I have hereunto set my hand on this 3rd day of February, A. D. 1930.

SOLOMON FORMAN.